United States Patent [19]

Lee et al.

[11] Patent Number: 5,224,431
[45] Date of Patent: Jul. 6, 1993

[54] BURNER DEVICE UTILIZING COMBUSTIBLE WASTES AS FUEL

[76] Inventors: Dae S. Lee, Rm A-106, Hanshin Apartment, #258 Non Hyun-Dong, Kangnam, Seoul, Rep. of Korea; Ho K. Shin, 13/1, 199-116, Manri-Dong 2 ga, Chung-Ku, Seoul, Rep. of Korea

[21] Appl. No.: 846,027

[22] Filed: Mar. 5, 1992

[30] Foreign Application Priority Data

Aug. 30, 1991 [KR] Rep. of Korea ............... 91-15161

[51] Int. Cl.⁵ .................................................. F23D 1/00
[52] U.S. Cl. ..................................... 110/210; 110/211; 110/244
[58] Field of Search ............... 110/210, 211, 243, 244, 110/248, 251, 254

[56] References Cited

U.S. PATENT DOCUMENTS

| | | | |
|---|---|---|---|
| 3,543,701 | 12/1970 | Doner | 110/211 |
| 4,354,440 | 10/1982 | McRee, Jr. | 110/244 |
| 4,438,706 | 3/1984 | Boday et al. | |
| 4,440,098 | 4/1984 | Adams | |
| 4,471,702 | 9/1984 | McKinlay | 110/211 |
| 4,496,306 | 1/1985 | Okigami et al. | |
| 4,509,434 | 4/1985 | Boday et al. | |
| 4,553,285 | 11/1985 | Sachs et al. | 110/244 |
| 4,595,356 | 6/1986 | Gaysert et al. | |
| 4,649,834 | 3/1987 | Hernan et al. | 110/210 |
| 4,697,530 | 10/1987 | Marcotte et al. | |
| 4,724,780 | 2/1988 | Hoffert et al. | |
| 4,747,781 | 5/1988 | Patenaude | |
| 4,752,213 | 6/1988 | Grochowski et al. | |
| 4,764,105 | 8/1988 | McElroy | |
| 4,802,423 | 2/1989 | Pennington | |
| 4,831,941 | 5/1989 | Childs | 110/211 |
| 4,850,288 | 7/1989 | Hoffert et al. | |
| 4,862,869 | 9/1989 | Hazard | 110/211 |
| 5,145,362 | 9/1992 | Obermueller | 110/211 |

Primary Examiner—Henry C. Yuen
Attorney, Agent, or Firm—Vidas, Arrett & Steinkraus

[57] ABSTRACT

A burner device utilizing combustible wastes as fuel comprising a body having a main combustion chamber, a preheating burner mounted to the upper portion of the body and a subsidiary combustion chamber mounted to the upper portion of the body and at the front of the preheating burner. The subsidiary combustion chamber includes an inwardly tapered frustconical tube and an outwardly tapered air chamber surrounding the frustconical tube and communicating with the tapered air chamber. The frustconical tube of a diffusion-depression type includes a fire outlet exposed to outside of the body, a inwardly tapered fire inlet faced to the preheating burner, a plurality of heat resistant and antioxide metal strips extending from the fire inlet to the fire outlet, an air discharging tube disposed along the center line of the frustconical tube at rear of the frustconical tube and provided at its peripheral portion with a plurality of air ports, a connecting tube connected to the air discharging tube to extend vertically across the air discharging tube and communicate with the tapered air chamber.

1 Claim, 1 Drawing Sheet

BURNER DEVICE UTILIZING COMBUSTIBLE WASTES AS FUEL

BACKGROUND OF THE INVENTION

1. Field of the Invention

The present invention relates generally to a burner device utilizing combustible wastes such as waste tires, waste rubber articles, waste oil and so forth as fuel and more particularly, to a burner device which enables to remove air polluting imperfect combustion materials generated in the course of combustion through a subsidiary combustion chamber, and to widely utilize high temperature thermal energy in the state of flame for a burner device such as an industrial oil burner, generated by re-burning the imperfect combustion materials.

2. Description of the Prior Art

It is generally known that a burner uses various types of oil such as light oil, bunker C oil and so forth as fuel, and there has been existed a waste disposal device only for burning and incinerating such combustible wastes as waste tires, waste rubber articles, waste oil and etc. There has not yet, however, provided a device which enables to be used as a burner taking high temperature thermal energy from said combustible wastes.

This is because it is difficult to burn combustible wastes, as oil. Even though they are burnt under the condition that oil is splashed thereon, imperfect combustion thereof occurs, thereby causing air pollution by imperfectly burnt exhaust gases. For secondarily burning these imperfectly burnt exhaust gases, a special combustion method should be used which requires a large quantity of energy, since a high temperature atmosphere of about 900° C. to about 1,300° C. should be maintained due to high firing point of the imperfectly burnt exhaust gases.

In the following description, a frustconical tube is diffused toward a fire outlet and then the pressure therein is reduced also toward the fire outlet, which is referred to as "a diffusion-depression type" hereinafter.

SUMMARY OF THE INVENTION

Therefore, it is an object of the present invention to provide a burner device utilizing combustible wastes as fuel, which is capable of minimizing the quantity of energy required in a secondary combustion of imperfectly burnt gases generated from the wastes, perfectly burning the imperfectly burnt gases by using a diffusion-depression typed frustconical tube adapted to mix the imperfectly burnt gases with a preheated air and burn them, without using any additional energy for re-burning of the imperfectly burnt gases, and taking a flame obtained by the perfect combustion of the imperfectly burnt gases to use directly the burner device as an industrial burner.

In accordance with the present invention, this object can be accomplished by providing a burner device utilizing combustible wastes as fuel comprising: a body having an inner wall defining a main combustion chamber, an outer wall spaced from said inner wall, and an air passage defined between said inner wall and said outer wall and adapted for receiving air from a fan, said inner wall having a plurality of air ports for communicating the air passage with said main combustion chamber; a preheating burner mounted to the upper portion of said body to extend into said main combustion chamber; a fuel charging inlet provided at the lower portion of said body and adapted for charging combustible wastes into said main combustion chamber; a support grill mounted on the lower portion of said inner wall and adapted for supporting combustible wastes thereon; and a subsidiary combustion chamber mounted to the upper portion of said body and at the front of said preheating burner, said subsidiary combustion chamber including an inwardly tapered frustconical tube and an outwardly tapered air chamber surrounding said frustconical tube and communicating with said tapered air chamber via a passage, said frustconical tube of a diffusion-depression type having a fire outlet exposed to outside of said body, a inwardly tapered fire inlet faced to said preheating burner, a plurality of peripherally spaced heat resistant and antioxide metal strips extending from the fire inlet to the fire outlet of the frustconical tube to have longitudinal gaps each being defined between adjacent metal strips, an air discharging tube disposed along the center line of said frustconical tube at rear of said frustconical tube and provided at its peripheral portion with a plurality of air ports, and a connecting tube connected to said air discharging tube to extend vertically across said air discharging tube and communicate with said tapered air chamber.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
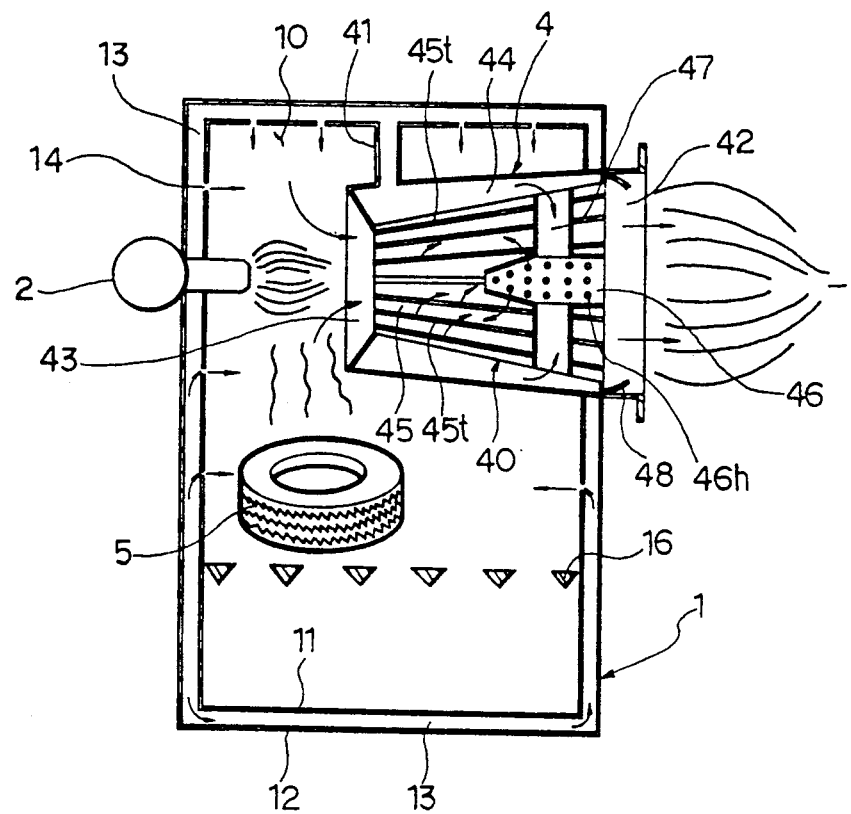
FIG. 1 is a sectional side view of a burner device in accordance with the present invention.
Figure 2:
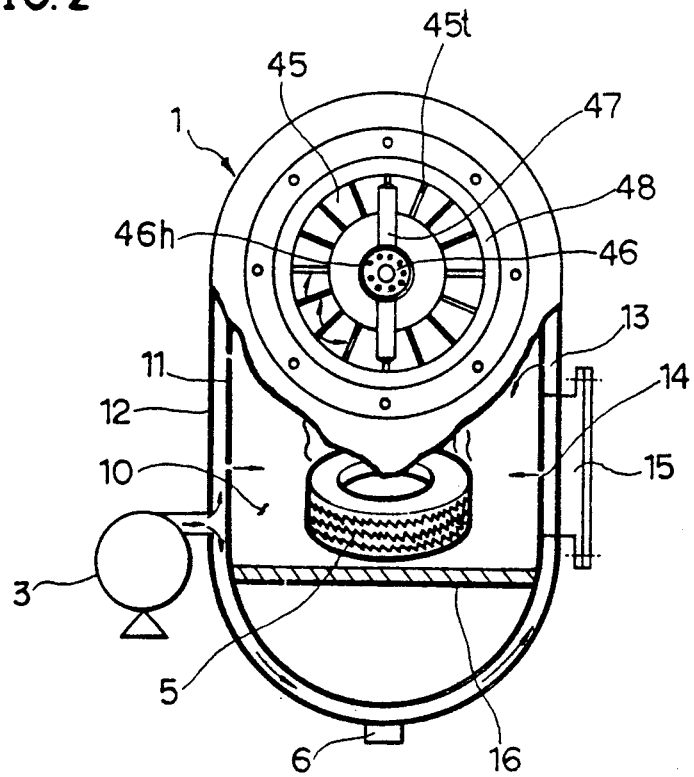
FIG. 2 is a sectional front view of the burner device in accordance with the present invention, which is partially cut away.

Referring to FIGS. 1 and 2, there is shown a burner device in accordance with the present invention. The burner device includes a body 1 having an inner wall 11 defining a main combustion chamber 10, an outer wall 12 spaced from the inner wall 11, and an air passage 13 defined between the inner wall 11 and the outer wall 12. Air is supplied by a fan 3 to the air passage 13. At the lower portion of the body 1, a fuel charging inlet 15 is provided, in order to charge fuel into the main combustion chamber 10. A support grill 16 for supporting combustible wastes thereon is mounted on the lower portion of the inner wall 11. At all portions positioned above the support grill 16, the inner wall 11 has a plurality of uniformly spaced air ports 14 for communicating the air passage 13 with the main combustion chamber 10. A preheating burner 2 is mounted on the upper portion of the body 1 and extended into the main combustion chamber 10. Opposite to the preheating burner 2, a subsidiary combustion chamber 4 is mounted on the upper portion of the body 1.

The subsidiary combustion chamber 4 includes an inwardly tapered frustconical tube 40 and an outwardly tapered air chamber 44 surrounding the frustconical tube 40 and communicating with the air passage 13 via the branch tube 41.

The preheated air in the air chamber 44 makes it possible to promote combustion in the subsidiary combustion chamber 4 and to cool the frustconical tube 40. All the preheated air is mixed in the frustconical tube 40 of the subsidiary combustion chamber 4.

The frustconical tube 40 is of a type of pressure-drop by diffusion which is referred to as a diffusion-depression type as noted hereinbefore.

The frustconical tube 40 has an fire outlet 42 exposed to outside of the body 1, a tapered fire inlet 43 faced to the preheating burner 2 and having a diameter that is gradually reduced away from the preheating burner 2. In the frustconical tube 40, a plurality of peripherally spaced heat resistant and antioxide metal strips 45 extend from the fire inlet 43 to the fire outlet 42 along the tapered outer wall of the frustconical tube 40. A longitudinal gap 45t is defined between each of the two adjacent metal strips 45. Near the fire outlet 42 in the frustconical tube 40, an air discharging tube 46 is disposed along the center line of the frustconical tube 40. The air discharging tube 46 has at its peripheral portion a plurality of air ports 46h. To the air discharging tube 46, a connecting tube 47 vertically extending across the air discharging tube 46 is connected which also communicates with the air chamber 44. Accordingly, air from the air chamber 44 can be supplied to the frustconical tube 40 via the air ports 46h and the gaps 45t. A fire guide 48 is mounted to the inner peripheral edge of the fire outlet 42.

In the drawings, there are shown combustible wastes 5 and a tube 6 for discharging ashes produced in burning the wastes 5.

Now, the operation of the burner device according to the present invention will be described in detail.

At first, the fuel charging inlet 15 is opened to charge the combustible wastes 5 into the main combustion chamber 10. Under the condition that the wastes 5 are laid on the support grill 16, the preheating burner 2 is ignited and then the combustible wastes 5 are fired by using oil or any ignition device for wastes in the beginning. Simultaneously, compressed air is supplied to the main combustion chamber 10 by the fan 3. The compressed air passes through the air passage 13 formed along the overall periphery of the body 1 between the inner wall 11 and the outer wall 12 and then comes into the main combustion chamber 10 via air ports 14 formed at the inner wall 11. The air supplied to the main combustion chamber 10 is maintained at a properly preheated state, by virtue of the heat provided by the preheating burner 2 and generated in the combustion of the wastes 5. Even though the fuel charging inlet 15 is maintained at its closed state, in burning the wastes 5, there is no problem in supplying air for combustion, that is, oxygen, since the air is supplied to the main combustion chamber 10.

During the combustion of the wastes 5, gases having a lower firing point, that is, gases having a high ionization trend are first burnt. High molecular gases having a higher firing point rise and aggregate with one another. Due to the aggregation, the high molecular gases may be cooled and thus carbonized, thereby forming imperfectly burnt gas. In accordance with the present invention, the formation of imperfectly burnt gas can be effectively prevented by the preheating burner 2 and the subsidiary combustion chamber 4. That is, the preheating burner 2 heats the upper portion of the main combustion chamber 10 to 1,000° C. so that the rising high molecular gases are heated to a proper temperature. At this time, air supplied from the air passage 13 to the upper portion of the main combustion chamber 10 is also heated to a proper temperature. The heated high molecular gases are mixed with the heated air and then passed through the frustconical tube 40 of the subsidiary combustion chamber 4. During passing through the frustconical tube 40, the high molecular gases are burnt. In the frustconical tube 40, air from the air chamber 44 which is maintained at a preheated state is supplied via the connecting tube 47, the air discharging tube 46, and the air ports 46h as well as the gaps 45t. The amount of supplied air corresponds to the diffusion rate of the frustconical tube 40, that is, the amount essentially required for a perfect combustion of the imperfectly burnt high molecular gases. Thus, it is possible to obtain a flame combustible perfectly at a high temperature.

At this time, even though the fuel charging inlet 15 is maintained at its closed state, there is no problem in supplying combustion air, that is, oxygen, since air is supplied to the frustconical tube 40 via the above mentioned air supplying path.

On the other hand, another imperfectly burnt gases such as smoke may be produced during the combustion of the wastes 5. These gases are also heated to 1,000° C. at the front of the tapered inlet 43 of the frustconical tube 40. The heated gases then pass through the frustconical tube 40 of the subsidiary combustion chamber 4. During passing through the frustconical tube 40, the gases are burnt. As the above-mentioned, air from the air chamber 44 which is maintained at a preheated state is supplied into the frustconical tube 40 via the branch tube 41, the connecting tube 47, the air discharging tube 46, and the air ports 46h as well as the gaps 45t. As the preheated air and the fire of the preheating burner 2 come into the frustconical tube 40 via the tapered inlet 43, the imperfectly burnt gases can be perfectly burnt. Accordingly, a flame with higher thermal energy can be discharged from the fire outlet 42.

On the other hand, the preheating burner 2 plays the role of both guiding the imperfectly burnt gases from the main combustion chamber 10 to easily introduce into the tapered inlet 43 of the frustconical tube 40 and raising the temperature of the imperfect burnt gases to be introduced into the tapered inlet 43.

In case that the temperature of the main combustion chamber 10 and the frustconical tube 40 is sufficiently raised, the operation of the preheating burner 2 may be stopped.

Since the frustconical tube 40 of the subsidiary combustion chamber 4 is of the diffusion-depression type, the preheated air can be suitably supplied thereto, during the secondary combustion of imperfectly burnt gases, in the amount corresponding to the diffusion rate of the frustconical tube 40, that is, the amount essentially required for a perfect combustion of the gases irrespective of the expansion of the imperfectly burnt gases by re-burning. Thus, it is possible to accomplish a perfect combustion of the gases.

As apparent from the above description, the present invention provides a burner device which is capable of utilizing combustible industrial wastes such as waste tires, as fuel and avoiding an environmental pollution by re-burning imperfectly burnt noxious gases produced in burning the industrial wastes. It is also possible to utilize the high thermal energy obtained by the perfect combustion of imperfectly burned gases, as various types of heat supplies in technical fields.

Although the preferred embodiments of the invention have been disclosed for illustrative purpose, those skilled in the art will appreciated that various additions and substitutions are possible, without departing from the scope and spirit of the invention as disclosed in the accompanying claims.

For example, the position of the preheating burner 2 and the fuel charging inlet 15 may be changed and the cooling of the combustion chamber may be accomplished by water cooling type instead of air cooling type mentioned above. Also it will not be necessary to restrict the number and/or the arrangement of the preheating burner 2 and the frustconical tube 40.

What is claimed is:

1. A burner device utilizing combustible wastes as fuel comprising:

a body having an inner wall defining a main combustion chamber, an outer wall spaced from said inner wall, and an air passage defined between said inner wall and said outer wall and adapted for receiving air from a fan, said inner wall having a plurality of air ports for communicating the air passage with said main combustion chamber;

a preheating burner mounted to the upper portion of said body to extend into said main combustion chamber;

a fuel charging inlet provided at the lower portion of said body and adapted for charging combustible wastes into said main combustion chamber;

a support grill mounted on the lower portion of said inner wall and adapted for supporting combustible wastes thereon; and a subsidiary combustion chamber mounted to the upper portion of said body and at the front of said preheating burner, said subsidiary combustion chamber including an inwardly tapered frustconical tube and an outwardly tapered air chamber surrounding said frustconical tube and communicating with said tapered air chamber via a passage, said frustconical tube of a diffusion-depression type having a fire outlet exposed to outside of said body, a inwardly tapered fire inlet faced to said preheating burner, a plurality of peripherally spaced heat resistant and antioxide metal strips extending from the fire inlet to the fire outlet of the frustconical tube to have longitudinal gaps each being defined between adjacent metal strips, an air discharging tube disposed along the center line of said frustconical tube at rear of said frustconical tube and provided at its peripheral portion with a plurality of air ports, and a connecting tube connected to said air discharging tube to extend vertically across said air discharging tube and communicate with said tapered air chamber.

* * * * *